(12) United States Patent
Iida (10) Patent No.: US 12,348,601 B2
(45) Date of Patent: Jul. 1, 2025

(54) COMMUNICATION APPARATUS AND COMMUNICATION METHOD

(71) Applicant: CANON KABUSHIKI KAISHA, Tokyo (JP)

(72) Inventor: Kiyoshi Iida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 17/845,166

(22) Filed: Jun. 21, 2022

(65) Prior Publication Data

US 2022/0417347 A1 Dec. 29, 2022

(30) Foreign Application Priority Data

Jun. 24, 2021 (JP) ................. 2021-105038

(51) Int. Cl.
| | |
|---|---|
| *G06F 15/16* | (2006.01) |
| *H04L 41/0654* | (2022.01) |
| *H04L 69/08* | (2022.01) |
| *H04W 4/80* | (2018.01) |
| *H04W 84/12* | (2009.01) |

(52) U.S. Cl.
CPC .......... *H04L 69/08* (2013.01); *H04L 41/0654* (2013.01); *H04W 4/80* (2018.02); *H04W 84/12* (2013.01)

(58) Field of Classification Search
CPC . H04L 69/08; H04L 41/0654; H04L 41/0672; H04L 43/0817; H04W 4/80; H04W 84/12; H04W 88/06; Y02D 30/70

USPC ......................................... 709/231
See application file for complete search history.

(56) References Cited

U.S. PATENT DOCUMENTS

| | | | |
|---|---|---|---|
| 2017/0163830 A1* | 6/2017 | Goda | H04N 1/32793 |
| 2020/0314221 A1* | 10/2020 | Venås | H04L 67/125 |
| 2021/0219373 A1* | 7/2021 | Moon | H04W 76/20 |
| 2022/0109746 A1* | 4/2022 | Lindheimer | H04L 69/24 |

FOREIGN PATENT DOCUMENTS

JP        2017-104999 A      6/2017

\* cited by examiner

*Primary Examiner* — Vivek Srivastava
*Assistant Examiner* — Karina J Garcia-Ching
(74) *Attorney, Agent, or Firm* — Canon U.S.A., Inc. IP Division (57) ABSTRACT

An apparatus comprising a communication circuit that includes a first section for communication conforming to a first protocol, a second section for communication conforming to a second protocol, a shared circuit shared between the first section and the second section is disclosed, a first control unit configured to control communication conforming to the first protocol, and a second communication control unit configured to control communication conforming to the second protocol. If an abnormality in the communication circuit is determined, the first control unit resets the first section after confirming that communication conforming to the second protocol is not being performed.

19 Claims, 5 Drawing Sheets

COMMUNICATION APPARATUS AND COMMUNICATION METHOD

BACKGROUND

Technical Field

An aspect of the embodiments relates to a communication apparatus and a communication method, and in particular relates to a communication apparatus and a communication method that can use a plurality of communication protocols.

Description of the Related Art

Conventionally, a function of communicating with an external device is commonly provided in a form of a module or a package in which circuits are integrated for each communication protocol (or communication standard). However, as increasing in the number of devices that support a plurality of communication protocols, among others, a combo chip in which circuits required for supporting a plurality of communication protocols are integrated on one module or package (Japanese Patent Laid-Open No. 2017-104999) has grown in use.

A combo chip realizes a reduction in a footprint for implementation and a decrease in consumption power by sharing a circuit used common to communication in different communication protocols. However, sharing a circuit can cause an issue that has not conventionally occurred. When, for example, one or more out of the circuits required for communication conforming to a first protocol are also being used by communication conforming to a second protocol, and circuits required for communication conforming to the second protocol are reset while communication conforming to the first protocol is active, communication conforming to the first protocol may be disconnected.

SUMMARY

According to an aspect of the embodiments, there is provided an apparatus comprising: a communication circuit that includes a first section for communication conforming to a first protocol, a second section for communication conforming to a second protocol, and a shared circuit shared between the first section and the second section; and at least one processor, and a memory coupled to the at least one processor storing instructions that, when executed by the processor, cause the processor to function as: a first control unit configured to control communication conforming to the first protocol, and a second control unit configured to control communication conforming to the second protocol, wherein, if an abnormality in the communication circuit is determined, the first control unit resets the first section after confirming that communication conforming to the second protocol is not being performed.

According to another aspect of the embodiments, there is provided a method that is executed by an apparatus that uses a communication circuit including a first section for communication conforming to a first protocol, a second section for communication conforming to a second protocol, and a shared circuit shared between the first section and the second section, the method comprising: when an abnormality is detected in communication conforming to the first protocol, resetting the first section after confirming that communication conforming to the second protocol is not being performed.

According to a further aspect of the embodiments, there is provided a non-transitory computer-readable medium storing a program executable by at least one processor included in an apparatus that includes a first section for communication conforming to a first protocol, a second section for communication conforming to a second protocol, and a shared circuit shared between the first section and the second section, wherein the program, when executed by the at least one processor, causes the apparatus to perform a method comprising: when an abnormality is detected in communication conforming to the first protocol, resetting the first section after confirming that communication conforming to the second protocol is not being performed.

Further features of the disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claims. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

Note that, in the following embodiment, a case will be described in which the embodiment is implemented as a digital camera. However, an image capturing function is not essential to the embodiment, which can be implemented as any electronic device. Examples of such an electronic device include video cameras, computer devices (personal computers, tablet computers, media players, PDAs, etc.), mobile phones, smart phones, gaming devices, robots, drones, and drive recorders. These are exemplary, and the embodiment can be implemented as other electronic devices.

Configuration of Digital Camera

Figure 1A:
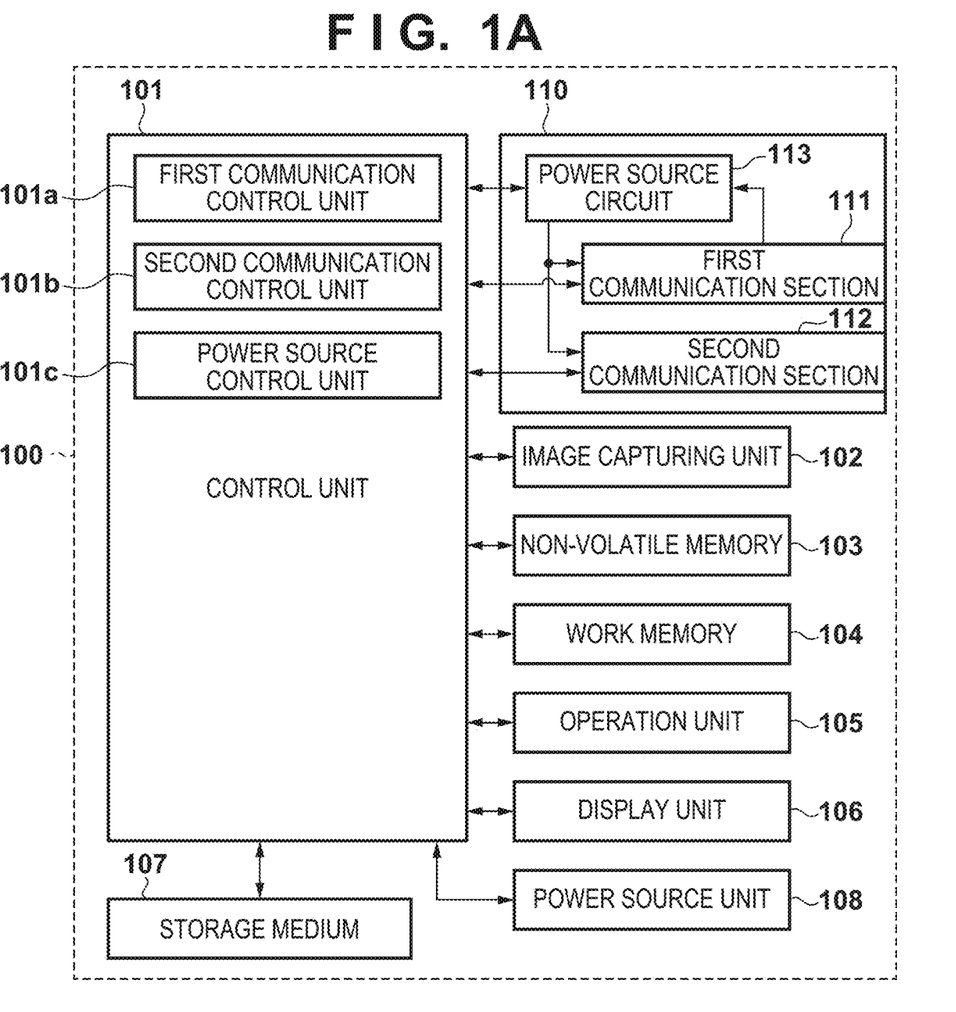
FIGS. 1A to 1C are diagrams related to a digital camera according to an embodiment.
Figure 1B:
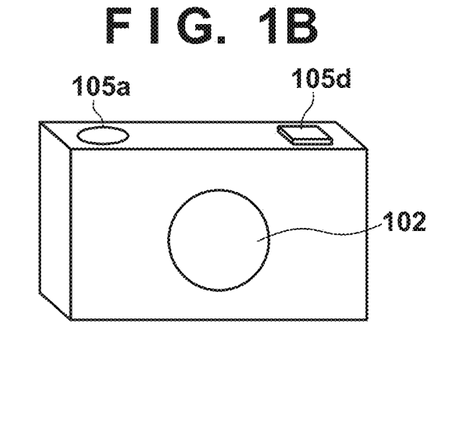
Figure 1C:
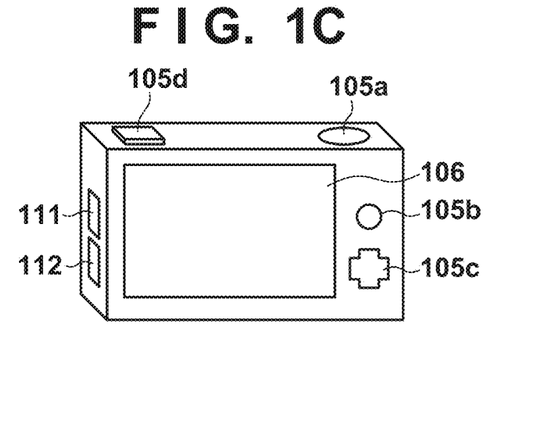

FIGS. 1A to 1C are diagrams related to a digital camera 100 that is an example of a communication apparatus according to an embodiment. FIG. 1A is a block diagram showing an exemplary functional configuration of the digital camera 100. In addition, FIGS. 1B and 1C are perspective diagrams showing appearance examples of the digital camera 100. FIG. 1B is a perspective diagram viewed from the front (subject) side, and FIG. 1C is a perspective diagram viewed from the rear (user) side.

A control unit 101 includes one or more processors that can execute a program. The control unit 101 causes the one or more processors to load a program stored in a non-volatile memory 103 to a work memory 104, and executes the program, for example. As a result of the one or more processors executing a program, the control unit 101 controls operations of a functional block of the digital camera 100, and realizes a function of the digital camera 100.

A first communication control unit 101a and a second communication control unit 101b schematically represent functions of the control unit 101 that controls operations of a first communication section 111 and a second communication section 112 of a communication circuit 110, respectively. In addition, a power source control unit 101c schematically represents the operation mode of the control unit 101 and the function of the control unit 101 controlling operations of a power source circuit 113 of the communication circuit 110. In the present specification, operations that are performed by the first communication control unit 101a, the second communication control unit 101b, and the power source control unit 101c are actually realized by the control unit 101 executing programs.

Note that one or more out of the first communication control unit 101a, the second communication control unit 101b, and the power source control unit 101c may be implemented by hardware other than that of the control unit 101. In that case, the control units are communicably connected to each other, and transmit/receive information to/from each other.

Note that a portion of processing that is executed by the control unit 101 may be realized using dedicated hardware, instead of being realized by a processor executing a program. Processing related to image processing and machine learning may be executed by using a dedicated integrated circuit (such as ASIC) suitable for such processing, for example.

The non-volatile memory 103 stores a program to be executed by the control unit 101, the setting values of the digital camera 100, and GUI data of a menu screen and the like, for example. The non-volatile memory 103 may be electrically rewritable, for example.

The work memory 104 is used for loading a program to be executed by the control unit 101, and storing values required when the program is being executed. The work memory 104 is also used as a buffer memory that temporarily holds image data read out from an image capturing unit 102 or a storage medium 107, for example. Furthermore, a partial region of the work memory 104 is also used as a video memory of a display unit 106.

The image capturing unit 102 includes an imaging optical system (lens unit) and an image sensor that converts a subject optical image formed by the lens unit into image signals. The lens unit includes movable members such as an aperture, a variable magnification lens, and a focus lens, and drive circuits for driving the movable members. The control unit 101 controls the opening amount of the aperture and the positions of the variable magnification lens and the focus lens by controlling the drive circuits.

The image sensor is a CMOS (Complementary Metal Oxide Semiconductor) image sensor or a CCD (Charge Coupled Device) image sensor, for example. In the image sensor, a plurality of pixels that include photoelectric conversion elements are two-dimensionally arranged. Each pixel generates an electrical signal having a voltage corresponding to an incident light amount. An electrical signal group generated by pixels is read out from the image sensor as image signals corresponding to a subject optical image formed by the lens unit. In this embodiment, the image sensor or the image capturing unit 102 includes an A/D converter, and outputs digital image signals (image data) obtained by performing A/D conversion on electrical signals read out from pixels. Operations of the image sensor are controlled by the control unit 101.

The control unit 101 applies predetermined image processing to image data obtained from the image capturing unit 102, generates image data to be used for recording and displaying, and obtains and/or generates information to be used for various types of control. Nonlimiting examples of image processing include color interpolation processing (demosaicing processing), white balance adjustment processing, tone correction processing, scaling processing, encoding and decoding processing, processing for detecting a feature region, and the like. In addition, nonlimiting examples of information used for various types of control include signals and evaluation values used for autofocus detection (AF), evaluation values used for automatic exposure control (AE), and the like.

The control unit 101 can display an image on the display unit 106 by writing image data for display to a video memory region of the work memory 104. In addition, encoding processing is applied to image data for recording as necessary, and the image data is stored in a data file having a predetermined format, and is recorded in the storage medium 107.

An operation unit 105 is a collective term for user-operable input devices or operation members of the digital camera 100. The operation unit 105 includes, for example, a power source switch 105d for the user to give an instruction to switch on/off the power source of the digital camera 100, a release switch 105a for giving an instruction to perform still image shooting, and a replay button 105b for giving an instructing to replay image data. The operation unit 105 also includes direction keys 105c for performing operations on a menu screen and the like, a determination button for determining a selected matter, a menu button for displaying a menu screen, and the like.

The operation unit 105 further includes an operation member (for example, connection button) for starting communication with an external device via the second communication section 112. In addition, if the display unit 106 is a touch display, the display unit 106 also functions as the operation unit 105.

Note that the release switch 105a includes two switches SW1 and SW2 that are switched on in accordance with a pressing amount. SW1 is switched on when the release switch 105a is pressed by about half the maximum pressing amount. In addition, SW2 is switched on when the release switch 105a is pressed by an amount close to the maximum pressing amount.

The control unit 101 recognizes an instruction to prepare for still image shooting when SW1 is switched on, and recognizes an instruction to start still image shooting when SW2 is switched on. When detecting that SW1 is switched on, the control unit 101 executes predetermined shooting preparation processing such as AF (autofocus) processing, AE (automatic exposure) processing, AWB (automatic white balancing) processing, and EF (flash preliminary emission) processing. In addition, when detecting that SW2 is switched on, the control unit 101 exposes the image sensor under an exposure condition determined in shooting preparation processing. The control unit 101 then generates still image data to for recording, based on image data read out from the image sensor, and records the image data in the storage medium 107.

Note that, here, a description has been given only on still image shooting, but the digital camera 100 can also perform moving image shooting. When, for example, an operation on an operation member (for example, moving image shooting button) of the operation unit 105 for giving a moving image shooting instruction is detected, the control unit 101 carries out shooting of a moving image to be recorded, reads out frame image data from the image sensor at a predetermined frame rate, and generates moving image data to be recorded. The control unit 101 obtains sound data from a microphone or the like in parallel with moving image shooting. The control unit 101 then records a moving image data file that stores the moving image data and the sound data to the storage medium 107.

The display unit 106 is, for example, a liquid crystal display. The display unit 106 displays a live view image, a captured image, GUI such as a menu screen, information regarding the digital camera 100, and the like. The display unit 106 may be an external display device connected to the digital camera 100. If the display unit 106 is an external display device, the control unit 101 outputs video image signals that can be displayed on the external display device.

The storage medium 107 is a removable semiconductor memory card, for example. The storage medium 107 records image data obtained by the image capturing unit 102. The storage medium 107 may include an external storage apparatus connected to the digital camera 100 and one or more storage apparatuses incorporated in the digital camera 100.

A power source unit 108 supplies power to the units of the digital camera 100. The power source unit 108 includes a secondary battery as a power source, for example. The power source unit 108 may be connectable to an adapter for supplying power from the outside. If an adapter is connected to the power source unit 108, the digital camera 100 operates using power supplied from the adapter. In addition, the power source unit 108 charges the power source using power supplied from the adapter.

The communication circuit 110 provides a function of communicating with an external apparatus, to the digital camera 100. The communication circuit 110 supports a plurality of communication protocols. In this embodiment, the communication circuit 110 supports two communication protocols, but the communication circuit 110 that supports three or more communication protocols may also be used.

In this embodiment, the communication circuit 110 is a combo chip having a form of one semiconductor package (IC package). In addition, the communication circuit 110 includes a circuit (shared circuit) that is used for both communication conforming to a first protocol and communication conforming to a second protocol that is different from the first protocol. This means that at least one of the circuits required for communication conforming to the first protocol is also a circuit required for communication conforming to the second protocol. Therefore, when the shared circuit stops operating, communication conforming both the first protocol and the second protocol cannot be performed. In addition, when a circuit required for communication conforming to the first (second) protocol is reset, communication conforming to the second (first) protocol is disconnected.

In this embodiment, as an example, the shared circuit is the power source circuit 113, and the other circuits are not shared, but the shared circuit may be another circuit, and there may be two or more shared circuits. In addition, in FIGS. 1A to 1C, the first communication section 111 includes a circuit for communication conforming to the first protocol, and the second communication section 112 includes a circuit for communication conforming to the second protocol. The power source circuit 113 supplies power to the first communication section 111 and the second communication section 112 based on power supplied from the control unit 101, for example. Therefore, the first communication section 111 and the second communication section 112 includes the common power source circuit 113.

The first communication section 111 and the second communication section 112 include circuits (antennas, modulation/demodulation circuits, communication controllers, or the like) corresponding to communication standards that the first communication section 111 and the second communication section 112 comply with. The control unit 101 communicates with communication controllers of the first communication section 111 and the second communication section 112, and controls operations of the first communication section 111 and the second communication section 112. Accordingly, the digital camera 100 can wirelessly communicates with an external apparatus through one of or both the first communication section 111 and the second communication section 112.

In this embodiment, as an example, the first communication section 111 performs short-range wireless communication conforming to the Bluetooth (registered trademark) standard and the second communication section 112 performs wireless communication conforming to the wireless LAN standard (IEEE802.11x) standard, with external apparatuses that are within the respective communication ranges. However, these standards are exemplary, and the first communication section 111 and the second communication section 112 may perform communication conforming to other standards.

Communication conforming to the Bluetooth standard has a narrower communication range than communication conforming to the wireless LAN standard, and the ideal highest communication speed of communication conforming to the Bluetooth standard is lower, but power consumption is low. Therefore, the first communication section 111 can maintain a communication stand-by state even when the digital camera 100 is in a state where the power supply is OFF. If the second communication section 112 is operated when the digital camera 100 is in a state where the power supply is OFF, consumption of the power source 108 is large, and which has a great influence during a period in which the digital camera 100 can operate. For this reason, the second communication section 112 is operated only when it is necessary.

Note that, in this embodiment, the second communication section 112 can operate in an AP mode for operating as an access point in an infrastructure mode, and in a CL mode for operating as a client in the infrastructure mode. By causing the second communication section 112 to operate in the CL mode, the digital camera 100 can operate as a client in the infrastructure mode. When operating as a client, the digital camera 100 can join a network formed by access points, by being connected to a nearby access point.

In addition, as a result of the second communication section 112 operating in the AP mode, the digital camera 100 can operate as an access point. Note that such an operation is limited to an operation as a simple access point (simple AP) that does not have a gateway function for connecting a connected client to another network.

When the digital camera 100 operates as a simple AP, the digital camera 100 forms a network by itself. An external apparatus that complies with the wireless LAN standard and is present in the communication range of the second communication section 112 can join the network formed by the digital camera 100.

In the communication circuit 110 that includes a plurality of communication sections, an abnormality may occur in communication or an operation of some communication section. When, for example, communication with an external apparatus cannot be normally performed, and it is not clear that this is caused by the external apparatus, the communication section is reset and an attempt is made to perform communication again. Resetting a communication section may be, for example, restarting the communication section by temporarily stopping power supply to the communication section and then resuming power supply. However, when the one power source circuit 113 is supplying power to a plurality of communication sections as in this embodiment, it is not possible to stop power supply to only a specific communication section. If, for example, supply of power is stopped in order to stop the first communication section 111, supply of power to the second communication section 112 is also stopped. Therefore, when the second communication section 112 is performing communication, communication performed by the second communication section 112 is disconnected as a result of resetting the first communication section 111. Also when individual communication sections include a shared circuit, and one communication section is reset, the shared circuit that is being used by another communication section is reset, and thus communication performed by the other communication section is disconnected as a matter of course. Note that resetting a circuit is not limited to stopping and resuming supply of power, and may be performed using another method such as input of a reset signal or a command.

Figure 2:
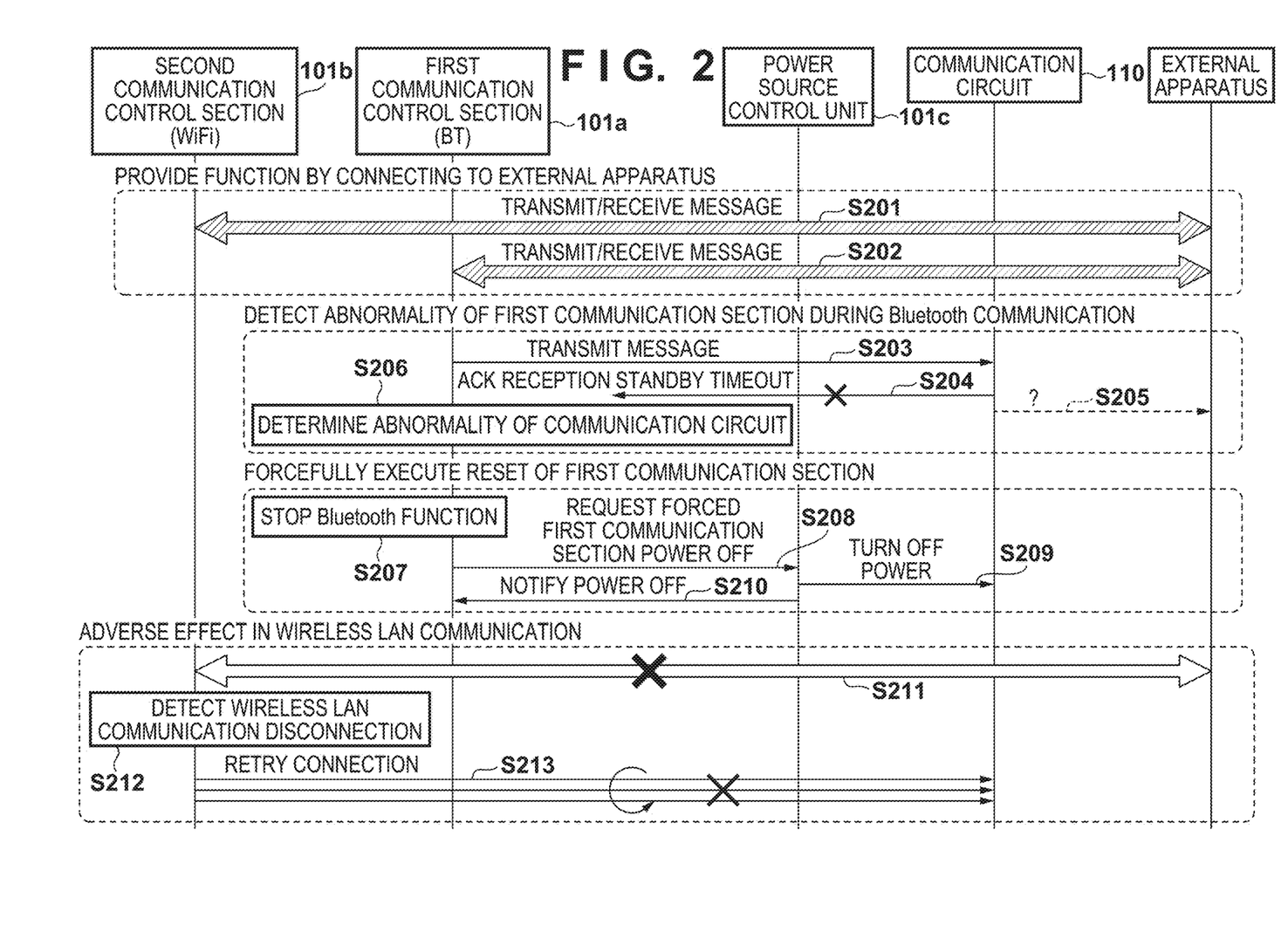
FIG. 2 is a sequence diagram for describing an issue in a communication circuit in which communication sections share a circuit, the issue being caused by an operation of resetting a communication section.

This situation will be described with reference to the sequence diagram shown in FIG. 2.

Here, assume that, as represented by steps S201 and S202, the digital camera 100 is transmitting/receiving messages to/from the same external apparatus via both the second communication section 112 and the first communication section 111. Note that the second communication section 112 and the first communication section 111 may establish connection with different external apparatuses.

The second communication control unit 101b controls the second communication section 112 of the communication circuit 110, and provides a wireless LAN communication function to the digital camera 100. In addition, the first communication control unit 101a controls the first communication section 111 of the communication circuit 110, and provides a Bluetooth (BT) communication function to the digital camera 100.

The power source control unit 101c switches the operation mode of the control unit 101 between a normal mode and an energy saving mode in which a sleep state is kept until specific interrupt is detected. In addition, the power source control unit 101c stops (switches off) and starts (switches on) operations of the power source circuit 113 of the communication circuit 110 in accordance with an ON or OFF request for the communication sections received from the first communication control unit 101a and the second communication control unit 101b.

In this embodiment, the communication circuit 110 has a configuration in which the one power source circuit 113 collectively supplies power to the first communication section 111 and the second communication section 112. Therefore, it is not possible to individually cause the first communication section 111 and the second communication section 112 to operate (ON) or stop operating (OFF). However, the power source control unit 101c individually manages ON and OFF of the first communication section 111 and the second communication section 112 based on an ON request (operation request) or an OFF request (operation stop request) from the communication control units to the individual communication sections.

Specifically, the power source control unit 101c manages a communication section that has not accepted an ON request in an OFF state, as if the communication section is off, even if in actuality the communication section is supplied with power and is on due to another communication section being on. In addition, the power source control unit 101c also manages a communication section that has accepted an OFF request in an ON state, as if the communication section is off, even if in actuality the communication section is not actually switched off due to another communication section being on.

In addition, only when the power source circuit 113 is off (has stopped operating and is not supplying power to any of the communication sections) and an ON request for a communication section is received from a communication control unit first time, the power source control unit 101c switches on the power source circuit 113. Accordingly, the power source circuit 113 starts operating, and starts supplying power to all notification units. However, when the power source circuit 113 is already in an ON state and is requested to switch on a communication section, the power source control unit 101c simply transmits notification of a fact that the communication section is on (operation start notification) to the requester, and the state of the power source circuit 113 does not change.

Similarly, when requested to switch off a communication section in a state where the power source circuit 113 is on, and one or more other communication sections are on, the power source control unit 101c transmits notification of a fact that the communication section is off (operation stop notification) to the requester without switching off the power source circuit 113.

Due to such an operation of the power source control unit 101c, the first communication control unit 101a and the second communication control unit 101b can operate without being conscious of whether or not the power source circuit 113 is a circuit shared among a plurality of communication sections, or an independent power source circuit is provided in individual communication sections.

Next, abnormality detection in the communication circuit 110 will be described.

The first communication control unit 101a transmits a message intended for an external apparatus or a control message intended for the communication circuit 110 (step S203), and waits until an Ack message is received (step S204). If an Ack message cannot be received within a certain period of time from when the message was transmitted, the first communication control unit 101a determines that an abnormality of some type has occurred in the communication circuit 110 (step S206).

If the message transmitted from the first communication control unit 101a in step S203 is a message intended for an external apparatus, and an Ack message cannot be received within a certain period of time, whether or not a message has been transmitted from the communication circuit 110 to the external apparatus is unknown (step S205). There are various factors due to which an Ack message cannot be received properly. When, for example, the entire communication circuit 110 has frozen, when only the first communication section 111 has frozen, or when an abnormality occurs in message data due to noise and the message data is discarded, an Ack message cannot be received properly.

Also when a communication abnormality is detected by the second communication control unit 101b, it is highly likely that the entire communication circuit 110 has frozen. In this case, for example, by switching off the entire communication circuit 110 once and switching it on again, it is possible to reset the entire communication circuit 110, and make an attempt to resume communication. However, when a communication abnormality is detected only by the first communication control unit 101a, there is the possibility that the second communication control unit 112 is normally operating.

Assume that, when the first communication control unit 101a detects a communication abnormality, Bluetooth communication is stopped (step S207), and the power source circuit 113 is then forcefully switched off through the power source control unit 101c in order to reset the first communication section 111 (steps S208, S209, and S210). Accordingly, power supply to not only the first communication section 111 but also the second communication section 112 stops, and thus wireless LAN communication is forcefully disconnected (step S211). When disconnection of wireless LAN communication is detected (step S212), the second communication control unit 101b attempts reconnection (step S213). However, reconnection is impossible until power supply to the second communication section 112 is resumed. For this reason, a service provided to an external apparatus through wireless LAN communication (for example, transfer of image data) is abnormally terminated, and the user is to restart use of the service through wireless LAN communication.

This embodiment provides a control method in which, when one communication control unit detects a communication abnormality, the corresponding communication section can be reset without affecting operations of another communication section. As an example, a case will be described below in which the first communication control unit 101a detects a communication abnormality, but the same applies when the second communication control unit 101b detects a communication abnormality.

Figure 3:
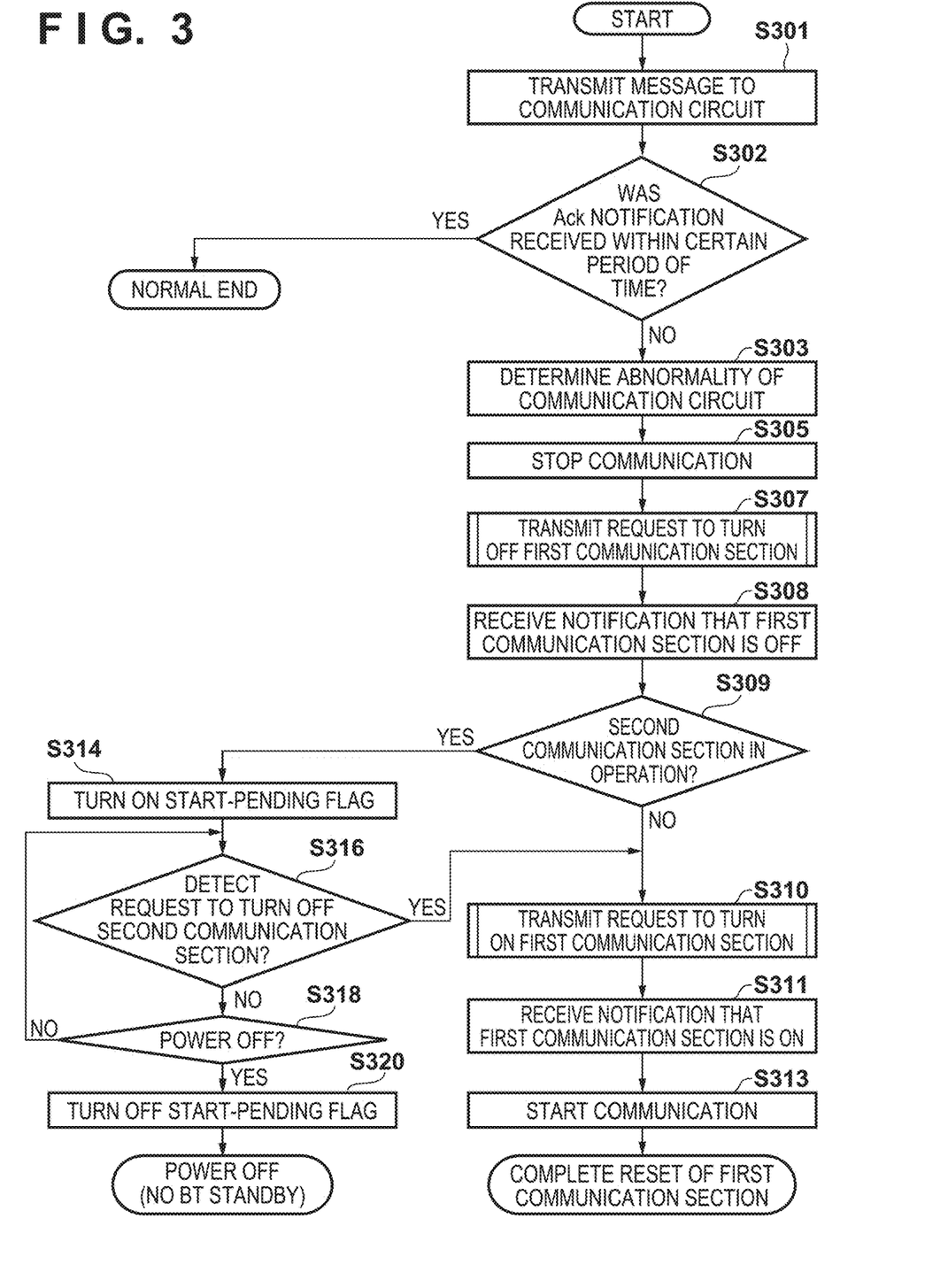
FIG. 3 is a flowchart related to operations of a communication control unit.

FIG. 3 is a flowchart related to operations of the first communication control unit 101a (the control unit 101) according to this embodiment.

In step S301, the first communication control unit 101a transmits a message intended for an external apparatus or the communication circuit 110, to the communication circuit 110.

In step S302, the first communication control unit 101a determines whether or not an Ack message has been received within a predetermined certain period of time from when the message was transmitted. If an Ack message has been received within the certain period of time, it is determined that the message was transmitted normally, and the first communication control unit 101a waits for next message transmission (normal termination).

On the other hand, if it is not determined that an Ack message has been received within the certain period of time from when the message was transmitted, the first communication control unit 101a executes step S303, and determines that an abnormality of some type has occurred in the communication circuit 110.

In step S305, the first communication control unit 101a executes processing for stopping communication that is being performed by the first communication section 111. Accordingly, the first communication section 111 does not perform a communication operation any longer even if supplied with power (does not accept a communication request from an external apparatus).

In step S307, the first communication control unit 101a then transmits an OFF request for the first communication section 111 to the power source control unit 101c. As will be described later, when a power source OFF request for the first communication section 111 is received, the power source control unit 101c maintains the on state of the power source circuit 113 or switches the power source circuit 113 off in accordance with the state of the second communication section 112, and transmits, to the requester, notification of a fact that the first communication section 111 is off (operation stop notification).

In step S308, when notification of a fact that power source the first communication section 111 is off is received from the power source control unit 101c, the first communication control unit 101a recognizes that the first communication section 111 is off (state where power supply to the first communication section 111 is stopped). It should be noted that there are cases where the first communication section 111 is not switched off in actuality.

In step S309, the first communication control unit 101a determines whether or not another communication section (the second communication section 112) is in operation. The first communication control unit 101a can determine whether or not the second communication section 112 is in operation, for example, by inquiring of the power source control unit 101c about the state (ON or OFF) of the second communication section 112. Note that, instead of determining whether or not the second communication section 112 is in operation, determination may be performed on whether or not the second communication control unit 101b is performing communication. Both the first communication control unit 101a and the second communication control unit 101b are actually realized by the control unit 101, and thus the first communication control unit 101a can be easily aware of whether or not the second communication control unit 101b is performing communication. Note that, when the second communication control unit 101b is not performing communication, the second communication section 112 is switched off in order to reduce the power consumption. Therefore, when the second communication control unit 101b is not communicating with an external apparatus, the second communication section 112 is off.

The first communication control unit 101a executes step S314 if it is determined that the second communication section 112 is in operation (is performing communication), and executes step S310 if it is determined that the second communication section 112 is not in operation (or is not performing communication).

When step S310 is executed, the power source circuit 113 has been switched off in accordance with an OFF request for the first communication section 111 transmitted in step S307, and supply of power has been stopped, and thus the first communication section 111 and the second communication section 112 have stopped operating. In step S310, the first communication control unit 101a transmits an ON request for the first communication section 111 to the power source control unit 101c. Upon receiving the ON request for the first communication section 111, the power source control unit 101c switches on the power source circuit 113, and transmits notification of a fact that the first communication section 111 is on (operation start notification) to the requester.

In step S311, the first communication control unit 101a receives, from the power source control unit 101c, the notification of the fact that the first communication section 111 is on. Accordingly, the first communication control unit 101a recognizes that reset of the first communication section 111 is complete.

In step S313, the first communication control unit 101a causes the first communication section 111 to start Bluetooth communication. To start Bluetooth communication may be specifically to start broadcasting periodical advertising signals. This is equivalent to a state of standby for a communication request from an external apparatus.

On the other hand, in step S314, the first communication control unit 101a turns on a start-pending flag allocated to a predetermined address of the work memory 104 (changes the value of the flag to a true value), for example. The start-pending flag will be described later.

In step S316, the first communication control unit 101a determines whether or not an OFF request for the second communication section 112 has been transmitted from the second communication control unit 101b to the power source control unit 101c. Both the first communication control unit 101a and the second communication control unit 101b are actually realized by the control unit 101, and thus the first communication control unit 101a can be easily aware of whether or not the second communication control unit 101b has transmitted an OFF request for the second communication section 112.

If it is determined that an OFF request for the second communication section 112 has been transmitted from the second communication control unit 101b, the first communication control unit 101a executes the above-described processing of step S310 onward. On the other hand, if it is not determined that an OFF request for the second communication section 112 has been transmitted from the second communication control unit 101b, the first communication control unit 101a executes step S318.

In step S318, the first communication control unit 101a determines whether or not the power source of the digital camera 100 has been switched off, in accordance with an operation performed on the power source switch 105d, or an operation having not been performed on the operation unit 105 for a certain period of time. The first communication control unit 101a executes step S320 if it is determined that the power source of the digital camera 100 has been switched off, and executes step S316 again if not.

In step S320, the first communication control unit 101a turns off the start-pending flag (changes the value of the flag to a false value). When the power source of the digital camera 100 is switched off, the first communication control unit 101a cannot wait for the second communication section 112 to stop operating. For this reason, the start-pending flag is turned off such that the first communication control unit 101a will be able to normally start communication when the power source of the digital camera 100 is switched on next time.

Note that, if it is detected in step S318 that the power source of the digital camera 100 is off, the first communication control unit 101a stops communication performed by the first communication section 111 in step S305. For this reason, even when supply of power to the first communication section 111 continues while the power source of the digital camera 100 is off, the digital camera 100 cannot be started by an external apparatus. When the power source of the digital camera 100 is switched on next time, the first communication section 111 normally starts, and accepts a communication request from an external apparatus.

In this manner, when switching off power supply to the first communication section 111 in order to reset the first communication section 111, the first communication control unit 101a confirms that another communication section is not in operation, and then transmits an OFF request for the first communication section 111 to the power source control unit 101c. For this reason, even when the first communication section 111 to be reset shares a circuit with another communication section, the first communication section 111 can be reset without affecting communication performed by the other communication section.

Figure 4:
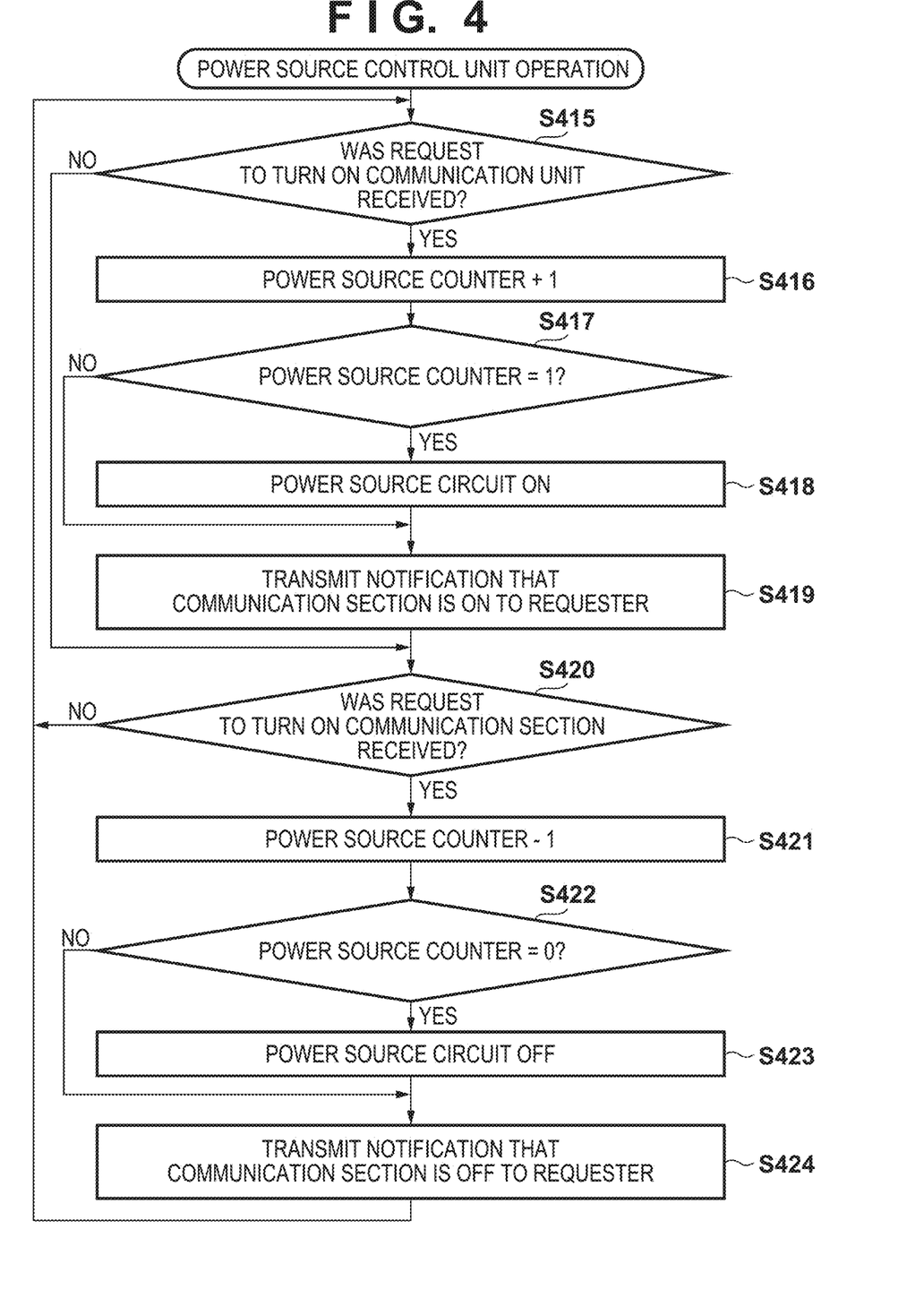
FIG. 4 is a flowchart related to operations of a power source control unit.

Next, operations of the power source control unit 101c will be described with reference to the flowchart in FIG. 4.

In step S415, the power source control unit 101c determines whether or not an ON request for the first communication section 111 or the second communication section 112 has been received, and executes step S416 if it is determined that an ON request has been received, and executes step S420 if not.

In step S416, the power source control unit 101c adds 1 to a value of a power source counter allocated to a predetermined address of the work memory 104, for example. The initial value of the power source counter is 0, and 1 is added in response to an ON request for the first communication section 111 and an ON request for the second communication section 112 being received, and 1 is subtracted in response to an OFF request being received. The number on the power source counter indicates the number of communication sections that are currently on. Therefore, the maximum value on the power source counter is equal to the total number of communication sections (here, 2) of the communication circuit 110.

In step S417, the power source control unit 101c determines whether or not the value on the power source counter is 1, and executes step S418 if it is determined that the value is 1, and executes step S419 if not.

Step S418 is executed when the value on the power source counter is 0 before the power source ON request is received in step S415. In this case, all of the communication sections are off, and thus the power source circuit 113 is off. For this reason, the power source control unit 101c executes step S419 after switching on the power source circuit 113.

In step S419, the power source control unit 101c transmits ON notification (operation start notification) requested for the communication section, to the requester of the ON request for the communication section received in step S415. Here, step S419 is executed regardless of whether or not step S418 is executed. This is performed in order to prevent operations of the communication control units from being affected by whether or not the communication circuits 110 is configured to be able to independently control ON/OFF of individual communication sections. Therefore, if one of the first communication section 111 and the second communication section 112 is already on and an ON request for the other communication section is received, the other communication section is already ON, but the communication control unit of the requester recognizes that the communication section is on when ON notification is received.

In step S420, the power source control unit 101c determine whether or not an OFF request for the first communication section 111 or the second communication section 112 has been received, and executes step S421 if it is determined that an OFF request has been received, and executes step S415 again if not.

In step S421, the power source control unit 101c subtracts 1 from the value on the power source counter, and executes step S422.

In step S422, the power source control unit 101c determines whether or not the value on the power source counter is 0, and executes step S423 if it is determined that the value is 0, and executes step S424 if not.

Step S423 is executed when all of the communication sections are switched off in response to a power source OFF request received in step S420. For this reason, the power source control unit 101c executes step S424 after switching off the power source circuit 113.

In step S424, the power source control unit 101c transmits OFF notification (operation stop notification) requested for communication section, to the requester of the OFF request for communication section received in step S420. Step S424 is executed regardless of whether or not step S423 is executed. This is performed such that operations of the communication control units are not affected by whether or not the communication circuit 110 is configured to be able to independently control ON/OFF of individual communication sections. When both the first communication section 111 and the second communication section 112 are on, and an OFF request for one of the communication sections is received, the one communication section is not switched off in actuality, but the communication control unit of the requester recognizes that the communication section has been switched off when the OFF notification is received.

After that, the power source control unit 101c repeatedly executes processing of step S415 onward.

Variation 1

Figure 5:
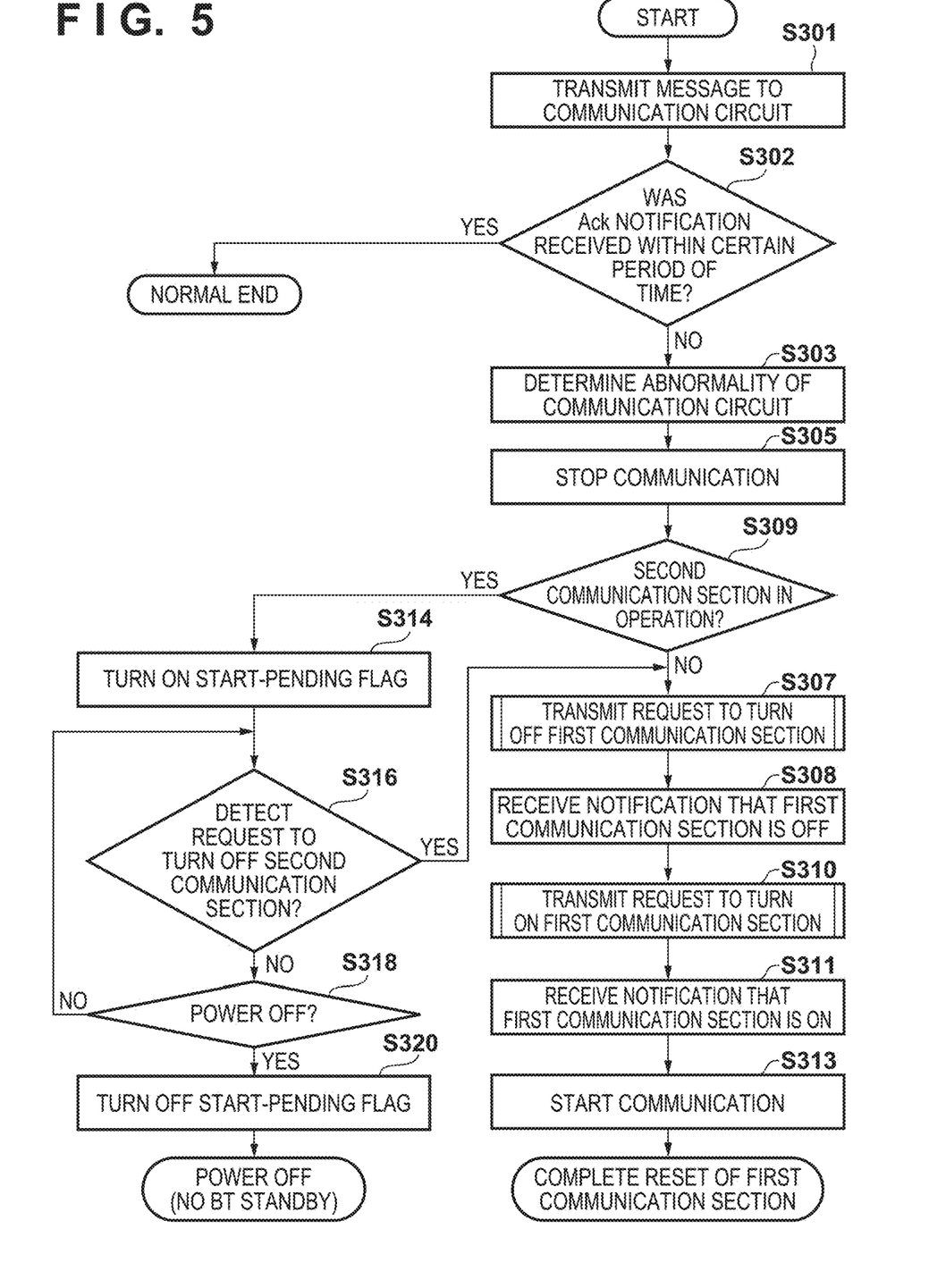
FIG. 5 is a flowchart related to other operations of the communication control unit.

In the flowchart shown in FIG. 3, an OFF request for the first communication section 111 is transmitted before determination is performed as to whether or not the second communication section 112 is in operation. However, the OFF request for the first communication section 111 may be transmitted after it is confirmed that the second communication section 112 is in operation. As shown in FIG. 5, for example, after communication performed by the first communication section 111 is stopped in step S305, determination may be performed in step S309 as to whether or not the second communication section 112 is in operation.

Variation 2

Note that, in this embodiment, a configuration is adopted in which, when a communication section that is not to be reset is in operation, the corresponding communication control unit waits for termination of the operation (detection of an OFF request). For this reason, when there is a communication section that constantly operates, a communication section to be reset cannot be reset. Examples of such a case include a case where the second communication control unit 101b according to this embodiment detects a communication abnormality, and attempts to reset the second communication section 112, but the first communication section 111 is constantly operating. In such a case, a determination condition in step S309 can be changed.

In step S309, for example, determination is performed as to whether or not a communication section in operation is performing data communication with an external apparatus, and step S310 can be executed if it is determined that the communication section is not performing data communication. A communication section fall within any one of the following situations can be determined as not performing data communication, for example.

connection with an external apparatus has been established, but transmission/reception of data has not been performed for a certain period of time.

operating in a state where connection with an external apparatus is not established, such as a standby state operating in an energy saving mode or in a sleep state Processing for detecting these states can be performed using a known method. Alternatively, individual communication control units may monitor the states of the corresponding communication sections, and hold information indicating the states of the communication sections in the work memory 104 such that the communication control units can refer to the information.

In addition, a configuration may be adopted in which, in step S309, determination is performed as to whether or not a communication section in operation is a preset communication section that is not affected largely even when communication is disconnected, and step S310 is executed if it is determined that the communication section is a communication section that is not affected largely even when communication is disconnected. A communication section that is used for communication whose importance level is not high, a communication section conforming to a communication protocol according to which reconnection is easy, and the like can be set as a communication section that is not affected largely even when communication is disconnected.

According to this embodiment, in a communication apparatus that includes a communication circuit including a shared circuit shared between a circuit for communication conforming to a first protocol and a circuit for communication conforming to a second protocol, a circuit related to communication conforming to one of the protocols is reset after confirming that communication conforming to the other protocol is not being performed. For this reason, the circuit related to communication conforming to the one protocol can be reset such that communication conforming to the other protocol is not affected largely.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-105038, filed on Jun. 24, 2021, which is hereby incorporated by reference herein in its entirety.

What is claimed is:

1. An apparatus comprising:
a communication circuit that includes a first section for communication conforming to a first protocol, a second section for communication conforming to a second protocol, and a shared circuit shared between the first section and the second section; and
at least one processor, and
a memory coupled to the processor storing instructions that, when executed by the processor, cause the processor to function as:
a first control unit configured to control communication conforming to the first protocol, and
a second control unit configured to control communication conforming to the second protocol,
wherein the first protocol corresponds to a Bluetooth standard, and the second protocol corresponds to a wireless LAN standard,
wherein the first section operates while the apparatus is in power-off state and the second section does not operate while the apparatus is in the power-off state, and
wherein, if an abnormality in the first section is determined by the first control unit, the first control unit resets the first section after confirming that the second section is not in operation;
wherein if the communication conforming to the second protocol is being performed when an abnormality in the first section is determined by the first control unit, the first control unit turns on a start-pending flag, and
wherein if the start-pending flag is on when an end of the communication conforming to the second protocol is detected, the first control unit resets the first section, and
wherein if the start-pending flag is on when the apparatus is powered off, the first control unit turns off the start-pending flag.

2. The apparatus according to claim 1,
wherein, when the second section is not in operation, the first control unit determines that communication conforming to the second protocol is not being performed.

3. The apparatus according to claim 1,
wherein, when the second control unit is not performing communication, the first control unit determines that communication conforming to the second protocol is not being performed.

4. The apparatus according to claim 1, wherein, if connection between the second section and an external apparatus has not been established, the first control unit determines that communication conforming to the second protocol is not being performed.

5. The apparatus according to claim 1,
wherein, when the second section is operating in an energy saving mode or is in a sleep state, the first control unit determines that communication conforming to the second protocol is not being performed.

6. The apparatus according to claim 1,
wherein the shared circuit is a power source circuit that collectively supplies power to the first section and the second section.

7. The apparatus according to claim 1, wherein the at least one processor further function as:
a power source control unit configured to control an operation of the shared circuit,
wherein, if an operation stop request for one of the first and second sections is received when the first section and the second section are operating, the power source control unit notifies operation stop of the one of the first and second sections to a requester of the operation stop request, without stopping the operation of the one of the first and second sections,
wherein, if an operation request for one of the sections is received when the first section and the second section are operating, the power source control unit notifies operation start of the one of the first and second sections to a requester of the operation request, without changing a state of the shared circuit,
wherein, if an operation request for one of the sections is received when the first section and the second section are not operating, the power source control unit causes the shared circuit to start power supply, and notifies operation start of the one of the first and second sections to a requester of the operation request, or
wherein, if an operation stop request for the other section is received when one of the first section and the second section is not operating, the power source control unit causes the shared circuit to stop power supply, and notifies an operating stop of the one of the first and second sections to a requester of the operation stop request.

8. The apparatus according to claim 1,
wherein the communication circuit has a form of one semiconductor package.

9. A method that is executed by an apparatus that uses a communication circuit including a first section for communication conforming to a first protocol, a second section for communication conforming to a second protocol, and a shared circuit shared between the first section and the second section, the method comprising:
when an abnormality is detected in communication conforming to the first protocol, resetting the first section after confirming that the second section is not in operation,
wherein the first protocol corresponds to a Bluetooth standard, and the second protocol corresponds to a wireless LAN standard, and
wherein the first section operates while the apparatus is in power-off state and the second section does not operate while the apparatus is in the power-off state;
wherein if the communication conforming to the second protocol is being performed when an abnormality in the first section is determined by a control unit, the control unit turns on a start-pending flag, and
wherein if the start-pending flag is on when an end of the communication conforming to the second protocol is detected, the control unit resets the first section, and
wherein if the start-pending flag is on when the apparatus is powered off, the control unit turns off the start-pending flag.

10. The method according to claim 9, wherein, if an abnormality in the communication circuit is determined, and the communication conforming to the second protocol is being performed, the resetting resets the first section after the communication conforming to the second protocol is terminated.

11. The method according to claim 9, further comprising:
controlling an operation of the shared circuit,
wherein, if an operation stop request for one of the first and second sections is received when the first section and the second section are operating, the share circuit notifies operation stop of the one of the first and second sections to a requester of the operation stop request, without stopping the operation of the one of the first and second sections, wherein, if an operation request for one of the sections is received when the first section and the second section are operating, the shared circuit notifies operation start of the one of the first and second sections to a requester of the operation request, without changing a state of the shared circuit, wherein, if an operation request for one of the sections is received when the first section and the second section are not operating, the shared circuit starts power supply, and notifies operation start of the one of the first and second sections to a requester of the operation request, or wherein, if an operation stop request for the other section is received when one of the first section and the second section is not operating, the shared circuit stops power supply, and notifies an operating stop of the one of the first and second sections to a requester of the operation stop request.

12. The method according to claim 9,
wherein the first protocol corresponds to a Bluetooth standard, and the second protocol corresponds to a wireless LAN standard.

13. A non-transitory computer-readable medium storing a program executable by one or more processors included in an apparatus that includes a first section for communication conforming to a first protocol, a second section for communication conforming to a second protocol, and a shared circuit shared between the first section and the second section, wherein the program, when executed by the one or more processors, causes the apparatus to perform a method comprising:

when an abnormality is detected in communication conforming to the first protocol, resetting the first section after confirming that the second section is not in operation, wherein the first protocol corresponds to a Bluetooth standard, and the second protocol corresponds to a wireless LAN standard, and wherein the first section operates while the apparatus is in power-off state and the second section does not operate while the apparatus is in the power-off state;

wherein if the communication conforming to the second protocol is being performed when an abnormality in the first section is determined by a control unit, the control unit turns on a start-pending flag, and wherein if the start-pending flag is on when an end of the communication conforming to the second protocol is detected, the control unit resets the first section, and wherein if the start-pending flag is on when the apparatus is powered off, the control unit turns off the start-pending flag.

14. The non-transitory computer-readable medium according to claim 13, wherein, if an abnormality in the communication circuit is determined, and the communication conforming to the second protocol is being performed, the resetting resets the first section after the communication conforming to the second protocol is terminated.

15. The non-transitory computer-readable medium according to claim 13, the method further comprising:
controlling an operation of the shared circuit,
wherein, if an operation stop request for one of the first and second sections is received when the first section and the second section are operating, the share circuit notifies operation stop of the one of the first and second sections to a requester of the operation stop request, without stopping the operation of the one of the first and second sections, wherein, if an operation request for one of the sections is received when the first section and the second section are operating, the shared circuit notifies operation start of the one of the first and second sections to a requester of the operation request, without changing a state of the shared circuit, wherein, if an operation request for one of the sections is received when the first section and the second section are not operating, the shared circuit starts power supply, and notifies operation start of the one of the first and second sections to a requester of the operation request, or wherein, if an operation stop request for the other section is received when one of the first section and the second section is not operating, the shared circuit stops power supply, and notifies an operating stop of the one of the first and second sections to a requester of the operation stop request.

16. The non-transitory computer-readable medium according to claim 13, wherein the first protocol corresponds to a Bluetooth standard, and the second protocol corresponds to a wireless LAN standard.

17. The apparatus according to claim 1, wherein the second protocol has a larger communication range or a larger power consumption that the first protocol.

18. The apparatus according to claim 1, wherein, if an abnormality in the first section is determined by the first control unit, the first control unit resets the first section even if the communication conforming to the second protocol is being performed, provided that the second section has been set as a section of the predetermined type.

19. The apparatus according to claim 18,
wherein, if an abnormality in the first section is determined by the first control unit, communication conforming to the second protocol is being performed, and the second section has not been set as a section of the predetermined type, the first control unit resets the first section after the communication conforming to the second protocol is terminated.

* * * * *